Jan. 6. 1925.

G. H. YOUNG 1,522,168

RESILIENT TIRE

Filed May 26, 1923

Inventor

George H. Young.

By Fischer Lagaard

Attorneys

Patented Jan. 6, 1925.

1,522,168

UNITED STATES PATENT OFFICE.

GEORGE H. YOUNG, OF ST. PAUL, MINNESOTA.

RESILIENT TIRE.

Application filed May 26, 1923. Serial No. 641,624.

*To all whom it may concern:*

Be it known that I, GEORGE H. YOUNG, a citizen of the United States, residing at St. Paul, in the county of Ramsey and State of Minnesota, have invented a new and useful Improvement in Resilient Tires, of which the following is a specification.

My invention relates to vehicle tires and has for its object to provide an inner and an outer rim member between which is positioned a number of resilient cushion members.

A still further object is to provide a plurality of cushion members positioned between said rim members, said cushion members being arranged to simultaneously act in cushioning the tire regardless of the position of the rims relative to each other and the tire relative to the ground.

A still further object is to provide pairs of complemental semi-circular spring members attached at one end to one of said rim members and at their other ends to the other of said rim members and to position between said semi-circular spring members a number of resilient rubber cushions.

A still further object is to provide a removable casing adapted to surround the outer said rim member to take the wear of the tire and to connect said rim members with flexible bands so that the tire thus formed is completely enclosed.

The full objects and advantages of my invention will be found in the detailed description thereof and are particularly pointed out in the claims.

In the drawings forming a part of this specification:

In automobile tire construction, it is highly desirable to provide a tire which is non-pneumatic and which affords the same resiliency as the pneumatic tire so that the annoyance of flat tires is done away with and the assurance of a load supporting tire at all times is secured. My invention provides such a tire by employing two rims between which are positioned a number of resilient members, which members are at all times brought into action to cushion the tire so that a minimum amount of weight is required for the tire.

Figure 1:
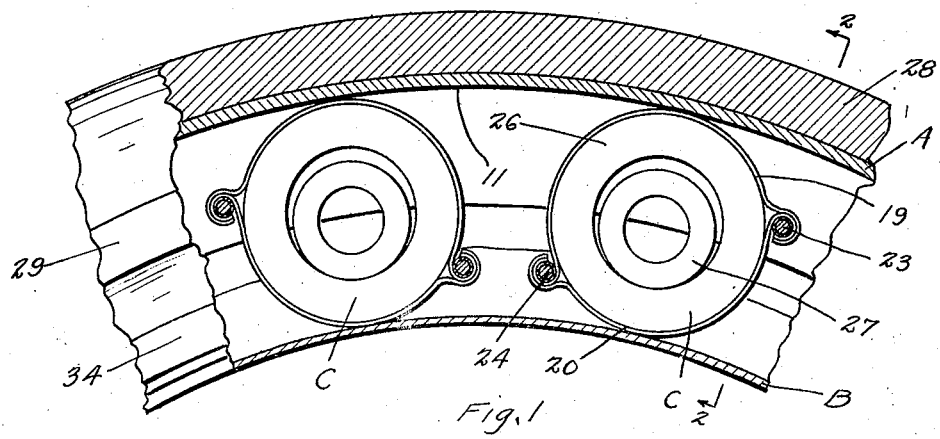
Figure 1 is a part sectional elevational view of a tire embodying my invention.
Figure 2:
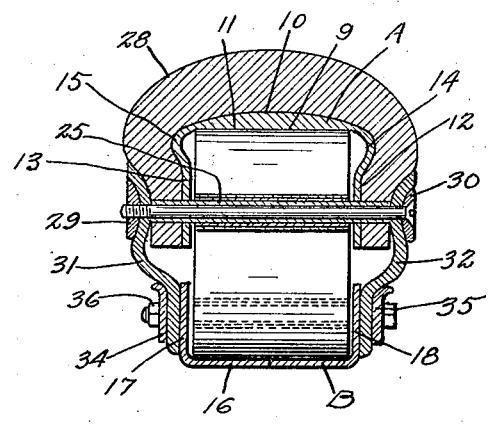
Figure 2 is a sectional view taken on line 2—2 of Figure 1.

In the form of the invention shown in Figures 1 and 2, I employ an outer and inner rim member A and B which are preferably constructed as shown in Figure 2. The rim member A is formed at its central portion 9 along its exterior with a curved surface 10 and along its interior with a flat surface 11. Along the sides of the rim A, the same is provided with radial flanges 12 and 13, which are connected to the body of the said rim by protruding portions 14 and 15, best shown in Figure 2. The rim B is of U-shaped cross section, having a flattened portion 16 adapted to fit upon the felly of the wheel and is further formed with two outwardly turned flanges 17 and 18 lying in the same plane as the flanges 13 and 12, the ends of said flanges being spaced from one another when the two rim members are concentrically positioned. If desired, the rim member B may be made in two sections, as illustrated in Figure 2, to permit of readily assembling the tire.

Figure 5:
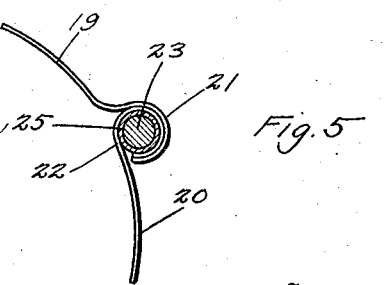
Figure 5 is an enlarged detail view showing the manner of attaching the semi-circular spring members to the inner and outer rim sections.

Positioned between the two rim sections A and B are mounted a number of resilient units C which are arranged through the entire circumference of the said rims. Each of these units comprises two semi-circular spring members 19 and 20, which are connected at one end to the rim A and at their other end to the rim B. The exact manner of making the same can best be seen in Figure 5. The two ends of the said semi-circular spring sections are formed with hooked portions or eyelets 21 and 22, which are adapted to surround bolts 23 and 24 attached to the respective flanges 12, 13, 17 and 18 of the rims A and B. A sleeve 25 is positioned about each of the bolts 23 and 24, the eyelet 22 lying adjacent the said sleeve and the eyelet 21 surrounding the first eyelet 22. With this arrangement, it can clearly be seen that both of the spring members 19 and 20 are hingedly connected to the bolts 23 and 24 to form a complete circular enclosure as clearly brought out in the drawings. The size of the spring members 19 and 20 is such that the circular enclosure formed thereby lies tangent to the surface 11 of the portion 9 of rim member A and also to the outer surface of the portion 16 of rim B so that the said spring members, in addition to being supported at the bolts 23 and 24, are further supported by direct contact with the walls of the rim members forming the two portions of the tire proper.

Within the two circular spring members 19 and 20, I position one or more resilient cushion members. In the form of the device shown in Figure 1, I have illustrated a cushion member at 26 which is of annular shape and fits snugly within the interior of the two spring members 19 and 20. Within the interior of the said cushion member 26 is positioned another cushion member 27 of the same shape as cushion member 26 but of smaller dimensions so that the same is normally free from engagement with the interior walls of the cushion member 26 when the tire is not loaded.

The operation of the device is apparent. When the tire is loaded, the cushion member C positioned at the bottom of the tire acts as follows: In this case, the two rim members A and B move radially toward one another causing the portions of the spring members 19 and 20, which are tangent with the surface of the rim members A and B, to approach each other and to compress and distort the cushion member 26. When the load upon the tire becomes great enough and the cushion member 26 has been sufficiently distorted, the auxiliary cushion member 27 will be brought into action to further cushion the tire. The action of the cushion units C at the sides of the tire differ from those at the bottom of the tire in that the movement of the rim members A and B instead of being radial is tangential. Since the two spring members 19 and 20 are connected to each of the rim sections A and B, it naturally follows, as the same move tangentially relative to each other, that the bolts or pivots 23 and 24 are either brought toward each other or away from each other. This has exactly the same effect upon the cushion members 26 and 27 as occurred when the spring members 19 and 20 were positioned at the top of the wheel, except that the movement is now in a different direction and the said cushion member C serves to cushion the tire in the same manner as when positioned at the bottom of the tire. It can thus readily be seen that the cushion members intermediate of the sides and top of the tire have a combined effect of the tangent and radial movement of the rim which is transmitted to the spring members 19 and 20 to cause the cushion members 26 and 27 to operate in the same manner. With this construction, a device is provided whereby all of the cushion units are at all times active in cushioning the tire so that less rigid cushion members need be employed thereby greatly reducing the weight of the tire.

The tread or wearing portion of the tire consists of a casing 28 which surrounds the exterior portion of the rim member A. This casing follows along the curved surface 10 of portion 9 of the said rim member around the protruding portions 14 and 15 and along the flange portions 12 and 13 thereof. This casing is securely held in place by means of two annular rings 29 and 30 which are positioned on the sides of the said casing directly opposite the flanges 12 and 13 of rim member A, which rings are held in place by the bolts 23, previously referred to, which pass directly through the same and are screwed therein. As the bolts 23 are tightened up, it can readily be seen that the casing 28 is drawn about on the curved surface 10 and around the protruding portions 14 and 15 so that, when the rings 29 and 30 are properly drawn up, the casing is drawn taut around the rim member A, thus providing a neat construction; at the same time, increasing the wearing life of the said casing.

For forming a tight connection between the outer and inner rim sections of the tire, I employ two flexible side walls 31 and 32 which are positioned between the rings 29 and 30 and the casing 28 and securely clamped in place by means of the said rings and bolts 23. These walls are made full and extend down along the flanges 17 and 18 of the rim section B where the said walls as securely clamped to the said flanges by means of rings 34 and 35 similar to the rings 29 and 30, which rings are clamped under the bolts 24 used for securing the spring members 19 and 20 to the rim section B. If desired, the bolts 24 may be provided with nuts 36 instead of being screwed directly into the said rings so that the said bolts 24 may be readily removed. With this arrangement, a water proof tire is provided in which perfect resiliency is secured, said tire being enclosed to prevent water from entering into the same and corroding and rotting the interior construction of the tire.

Figure 3:
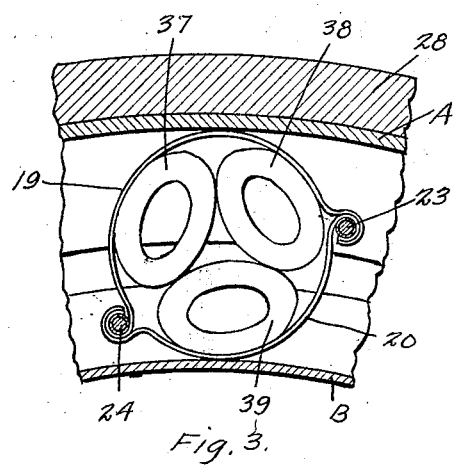
Figure 3 is a view similar to Figure 1 of a modification of the invention.

In the form of the invention shown in Figure 3, three cushion members 37, 38 and 39 are employed instead of the two cushion members 26 and 27. These members are all of the same size and shape and are normally circular in formation. In assembling these cushion members, the same are partially distorted, as shown in Figure 3, to position the same within the spring members 19 and 20 as desired.

Figure 4:
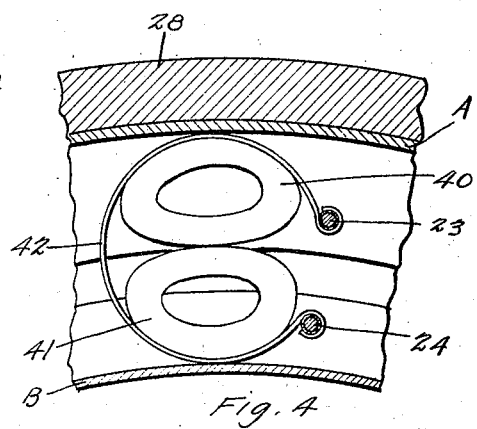
Figure 4 is a view similar to Figure 3 of still another form of the invention.

In Figure 4, another modification of the invention is shown in which two cushion members, such as shown at 40 and 41, are employed which are quite similar to the cushion members 37, 38 and 39 illustrated in Figure 3. In this case, however, the bolts 23 and 24 are placed opposite each other and a single spring member 42 employed, which is directly secured to the bolts 23 and 24 having an open portion between the said bolts. The action of this device is quite similar to either of the other forms but has the advantage of being simpler in construction.

The advantages of my invention are manifest. A tire is provided in which all of the cushion elements thereof are put into action at the same time when the tire is loaded so that maximum efficiency of the cushion elements is at all times secured and a tire of minimum weight is provided. In addition, the direction of application of the load to each of the cushion members changes so that the cushion members are all successively loaded in all directions thereby greatly increasing the life of the respective cushion members. A detachable casing is provided which may readily be removed when worn out and replaced with another casing. With this construction, it is possible to wear the casing completely down to the rim thereby securing the highest economy in the wear on the casing as compared to pneumatic tires. The entire interior construction of the tire is completely enclosed by flexible rubber side walls so that the tire is perfectly water proof preventing the interior construction from becoming corroded or rotted; at the same time, giving a tire with perfect resiliency.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims:

I claim:

1. A tire comprising outer and inner rim sections, oppositely facing flanges formed thereon, semi-circular spring members positioned between said rim sections, having their opposite ends attached to opposite flanges and resilient members within said spring members.

2. A tire comprising outer and inner rim sections, oppositely facing flanges formed thereon, semi-circular spring members positioned between said rim sections, attaching means for the ends of said spring members secured to opposite flanges, said attaching means being arranged in diagonal relation relative to said rim sections and resilient members within said spring members.

3. A tire comprising inner and outer rim members, semi-circular spring sections secured at one end to one of said rim sections and at their other ends to the other of said rim sections, said spring members lying in tangential contact with the surface of said rim members and resilient cushion members positioned within said spring members.

4. A tire comprising a pair of rim sections, said rim sections having oppositely facing flanges, semi-circular spring members positioned between said rim sections and within said flanges, bolts passing through pairs of said flanges for securing an end of each of said spring members to one of said rim sections and similar bolts passing through other flanges for securing the other ends of said spring members to said other rim section and resilient cushion members within said spring members.

5. A tire comprising a pair of rim sections, said rim sections having oppositely facing flanges, semi-circular spring members positioned between said rim sections and within said flanges, bolts passing through pairs of said flanges for securing an end of each of said spring members to one of said rim sections and similar bolts passing through other flanges for securing the other ends of said spring members to said other rim section and resilient cushion members within said spring members, and a casing member surrounding said outer rim and held in place by means of bolts passing through the flanges thereof.

6. A tire comprising outer and inner rim sections, a casing surrounding said outer rim section, rings positioned on the sides of said casing and bolts passing through said rings for clamping said casing in place upon said rim section.

7. A tire comprising a pair of rim sections, said rim sections having oppositely facing flanges, semi-circular spring members positioned between said rim sections and within said flanges, bolts passing through pairs of said flanges for securing an end of each of said spring members to one of said rim sections and similar bolts passing through other flanges for securing the other ends of said spring members to said other rim section and resilient cushion members within said spring members, and a casing member surrounding said outer rim and held in place by means of the bolts passing through the flanges thereof, and side walls secured to said rings and attached to said inner rim section.

8. A tire comprising outer and inner rim sections, oppositely facing flanges formed thereon, semi-circular spring members positioned between said rim sections, having their opposite ends attached to opposite flanges near the extreme edges thereof, said spring members resting upon said rim sections and resilient means positioned within said spring members.

9. A tire comprising outer and inner rim sections, a plurality of hollow resilient cushion members positioned between said rim sections, means for yieldingly confining the exterior of said cushion members, said cushion members being free along the hollow portions thereof.

10. A tire comprising outer and inner rim sections, resilient means positioned between said rim sections, a tread mounted upon said outer rim section having portions thereof extending along the sides of said outer rim section and flexible side walls connected to said tread portions along one edge and to said inner rim section along the other edge by transverse means.

11. A tire comprising outer and inner rim sections, resilient means positioned between said rim sections, a tread mounted upon said outer rim section, having portions thereof extending along the sides of said outer rim section and flexible means connected to said tread and inner rim section for hermetically sealing said tire.

GEORGE H. YOUNG.